United States Patent [19]

Yamamoto et al.

[11] 4,145,506

[45] Mar. 20, 1979

[54] PACKING MATERIALS FOR GAS SEPARATION COLUMNS

[75] Inventors: Yokichi Yamamoto; Yoshinari Ohwaku, both of Ichihara, Japan

[73] Assignee: Toray Silicone Company, Ltd., Tokyo, Japan

[21] Appl. No.: 848,532

[22] Filed: Nov. 4, 1977

[30] Foreign Application Priority Data

Dec. 29, 1976 [JP] Japan .................................. 51-158248

[51] Int. Cl.$^2$ .............................................. C08G 77/04
[52] U.S. Cl. ........................................ 528/10; 55/386; 210/198 C; 528/32; 528/43
[58] Field of Search ...................... 55/386; 210/198 C; 260/46.5 R; 528/32, 43, 10

[56] References Cited

U.S. PATENT DOCUMENTS

| | | | |
|---|---|---|---|
| 3,354,095 | 11/1967 | Burzynski et al. | 260/46.5 R |
| 3,395,117 | 7/1968 | Burzynski et al. | 260/46.5 R |
| 3,414,540 | 12/1968 | Nugent et al. | 260/46.5 R |
| 3,450,672 | 6/1969 | Merrill | 260/46.5 R |
| 3,489,782 | 1/1970 | Pruvost et al. | 260/46.5 R |
| 3,496,126 | 2/1970 | Burzynski | 260/46.5 R |
| 3,642,693 | 2/1972 | Jasinski | 260/46.5 R |
| 3,795,313 | 3/1974 | Kirkland | 55/386 |
| 4,026,868 | 5/1977 | Merrill | 260/46.5 R |

OTHER PUBLICATIONS

Kirk–Othmer, Encyclopedia of Chemical Technology, vol. 5, 1964, pp. 434 and 435.

*Primary Examiner*—Melvyn I. Marquis
*Attorney, Agent, or Firm*—Robert L. McKellar

[57] ABSTRACT

Packing materials for gas chromatography columns are disclosed. The columns can be used to separate polar compounds with low boiling points. The packing materials, which consist mainly of particulate $RSiO_{3/2}$ resin, where R is alkyl, aryl or alkenyl, have excellent separation efficiencies.

1 Claim, 2 Drawing Figures

PACKING MATERIALS FOR GAS SEPARATION COLUMNS

BACKGROUND OF INVENTION

The present invention deals with improved column packing materials for gas chromatography columns.

Particulate substances with high adsorptivity such as silica gel, activated charcoal, molecular sieves and activated alumina have been used as packing materials for gas separation columns, especially for the gas-solid phase gas chromatography type of gas chromatography columns. Packing materials for the gas-liquid phase gas chromatography columns have been prepared from sintered diatomaceous earth products and have been used as supports for the stationary phase of the separation column. Such supports are impregnated or coated with a stationary phase liquid such as dioctyl phthalate, tricresyl phosphate, liquid paraffin, benzyldiphenyl, Carbowax, glycerin, polysiloxane oil and some uncured polysiloxane rubber latices. Gas-solid phase chromatography silica gel, activated charcoal, molecular sieves or activated alumina indicated above as column packing is, however, only suitable for inorganic gases such as $H_2$, $O_2$ and $N_2$ and low molecular weight hydrocarbon gases having from 1 to 3 carbons. Further, the maximum elution temperature which can be used with those materials is low and the number of times the column can be reused is limited. Where the packing materials are impregnated with or coated with the stationary phase liquids such as polysiloxane oil and uncured polysiloxane rubber latices, a high temperature can be used and the number of times such as a column can be reused are improved. However, such packing materials have drawbacks in terms of poor separation efficiencies of polar compounds with relatively low boiling points such as water, low molecular weight alcohols, lower aliphatic acids, low molecular weight aldehydes, and low molecular weight amines. In addition, the impregnation or coating of the stationary phase support with the stationary phase liquids requires highly advanced techniques and complex procedures as well as long, in use, stabilization times.

Recently, porous polymer beads have come into use as packing materials for the gas-solid phase chromatography columns for separating polar compounds and materials containing water. The maximum temperature which can be used is not much higher than 250° C. and the separation of polar compounds with relatively low boiling points such as water, low molecular weight alcohols, lower aliphatic acids, low molecular weight aldehydes, and low molecular weight amines is unsatisfactory.

It was therefore necessary to investigate new materials and methods of obtaining good resolution of such polar mixtures in gas chromatograph techniques.

As a result, there have been discovered improved packing materials for gas chromatograph columns which allow their use at high temperatures for prolonged periods of time and which can be re-used a great number of times. Further, the improved packing materials are highly suitable for the separation of polar compounds with low boiling points such as water, lower boiling alcohols, aliphatic acids, aldehydes and amines.

The improved packing materials are particulate silicone resins which have been prepared from hydrolyzable silanes.

Such resins consist essentially of the units $RSiO_{3/2}$ but can contain some additional units selected from $R_2SiO$, $R_3SiO_{1/2}$ and $SiO_{4/2}$ or mixtures of them. The main siloxane unit is $RSiO_{3/2}$ and the remaining units, if present, are present in minor amounts. By minor amounts we mean ten (10) percent by weight, or less, based on the weight of the $RSiO_{3/2}$ resin and the additional units. The $RSiO_{3/2}$ resin must be a solid for purposes of this invention and therefore, the additional units must be selected in weight and kind in order to maintain the solid structure.

The resins, for the most part, are hydrolyzed under standard silane hydrolysis conditions. Such methods are well-known in the art and need not be repeated here except that in the case of the chlorosilanes, the reaction is carried out under dehydrochlorination condensation conditions with or without solvents present and in the case of alkoxy silanes, the hydrolysis reaction is carried out in the presence of acid or alkali catalysts under conditions such that condensation occurs, with removal of formed alcohol, with or without solvents present.

The products are obtained by removing the by-produced acids or alcohols, water, solvents and catalyst residues to leave particulate resins containing small amounts of residual silanol or alkoxy groups.

These organosilicon resin particles may contain small residual amounts of organosilicon polymer with low degrees of polymerization, by-produced hydrochloric acid, salts produced by neutralization of hydrochloric acid, residual alkali used for the neutralization, and catalyst residues from the catalysts used for the hydrolysis of alkoxysilanes. The organosilicon polymer with low degrees of polymerization must be removed by washing or extraction with organic solvents such as hexane, cyclohexane, actone, methyl ethyl ketone, methanol, and toluene. HCl, salts, alkali and catalyst residues must be also removed by washing or extraction with water. The water or organic solvents used are preferably removed in a subsequent step by heating and drying at atmospheric pressure or reduced pressure.

The resins are then subjected to crushing to render them particulate and then sieved to separate the undesirable mesh sizes. The resins are suitable for this invention which have a mean particle size of 50 mesh to 150 mesh when sieved according to Tyler Standard Mesh. If the particles are smaller than 50 mesh, the separation resolution decreases; if they are larger than 150 mesh, the operational efficiency of the sample analysis/separation suffers.

In the above formulas, R can be alkyl, aryl or alkenyl groups. Specific examples of R as alkyl are methyl, ethyl, n-propyl, isopropyl, n-butyl and 3,3,3-trifluoropropyl. Specific examples of R as aryl are phenyl, tolyl, p-chlorophenyl and α-naphthyl groups. The alkenyl groups can be either vinyl or allyl.

These organosilicon resin particles can be used in packing materials for gas separation columns especially for gas chromatography columns, without further treatment. Alternatively, in order to improve the separation efficiency, the following treatments can be added. The particles can be placed in a furnace, kept at the maximum temperature at which gas chromatography is to be carried out (up to 300° C.), and treated with inert gases such as nitrogen, helium and argon for 10 to 30 hours. Or, it is possible to select the particles of a particular grain size, most suitable for a given kind of sample gas to be separated or analyzed.

These particles can be used as a stationary phase support in gas-liquid phase chromatography. The support particles may be impregnated directly with the liquid stationary phase, or the particles may be impregnated with a liquid stationary phase using a solvent. The impregnation is then followed by drying at room temperature or with heating. The known stationary phase supports such as calcined diatomaceous earth, crushed refractory brick and synthetic silica are generally impregnated beforehand with the stationary phase liquid in the amount of 1 to 30 wt%. If the amount of impregnated stationary phase liquid is smaller than 1 wt%, the adsorptivity of the stationary phase support is relatively high, resulting in poorer gas separation efficiency. On the other hand, if the present organosilicon resin particles are used as the stationary phase support as described above, the gas separation efficiency is not reduced. Thus another characteristic of the present invention is that these resin particles can be used in the separation and analysis of various gases.

EXAMPLE 1

Purified monomethyltrichlorosilane (100 g) was added dropwise to a glass container containing water (1 liter) over a period of 30 min. with stirring via an electric motor. The mixture was further stirred for 10 min. after the addition was completed. A white gel-like material which formed on the surface of the water was filtered off. The white gel was washed thoroughly with water until the filtrate became neutral. The white gel was then crushed in a mortar. The crushed particles were placed in a glass container containing methanol (0.5 liter), and the mixture was stirred for 60 min. and then filtered. The residue collected by filtration was placed in a furnace containing nitrogen gas atmosphere and was kept at 250° C. for 24 hours. After cooling to room temperature, the dried residue was crushed in a mortar. The 100–120 mesh particles were then separated by sieving using a Tyler Standard Mesh.

The organosilicon resin particles prepared above were packed in a stainless steel column (diameter: 3 mm; length: 120 cm). Glass wool plugs were used at both ends of the column to prevent the escape of the packing material. The packed column was installed in a programmed-temperature gas chromatography apparatus (Model GP-4B gas chromatography manufactured by Shimadzu Seisakusho, Ltd.). Helium was used as a carrier gas (initial pressure at inlet: 2 kg/cm$^2$). The column temperature was kept at 50° C. for a short time. Then, a sample (1 ml.) of a mixture of equimolar amounts of water, allylamine, pyridine, picoline and aniline was injected into the column. The column temperature was raised from 50° C. to 250° C. at a rate of 12° C./min. The resulting gas chromatogram is shown in FIG. 1. All constituents were well separated.

EXAMPLE 2

In place of the monomethyltrichlorosilane in Example 1, a mixture of monomethyltrichlorosilane (90 g.) and tetrachlorosilane (10 g.) was hydrolyzed under the same conditions as described in Example 1. The 100 to 120 mesh particles were taken after sieving.

These particles were used to pack a gas chromatography column similar to the one used in Example 1, which was used for the separation and analysis of a mixture comprised of equimolar amounts of water, formic acid, acetic acid and propionic acid. Other procedures were the same as described in Example 1. The four constituents were separated well and the gas chromatogram showed well-defined peaks without tailing.

EXAMPLE 3

Purified monophenyltrichlorosilane (100 g.) was added dropwise over a period of 30 min. to a glass container containing water (0.5 liter) and xylene (0.5 liter) with stirring via an electric stirrer. The mixture was stirred another 5 min. after the addition was complete. The aqueous solution was discarded and the xylene fraction was washed well with water until the wash solution became neutral. Then, the xylene was evaporated under reduced pressure with heating. The polyphenylsilsesquioxane obtained was a light yellow substance in the form of flakes. This substance was placed in a glass container containing acetone (0.5 liter), and the mixture was stirred for 60 min. and then filtered. The material retained on the filter was placed in a furnace containing a nitrogen gas atmosphere and was left to dry at 300° C. for 20 hours. After cooling to room temperature, the dried residue was crushed in a mortar. The particles 130–150 mesh were separated by sieving.

The organosilicon resin particles prepared above were packed in the gas chromatography column. An equimolar mixture of methanol, ethanol and acetone was separated and analyzed according to the same procedures as described in Example 1. The three constituents were separated well and the peaks obtained on the gas chromatogram did not show tailing.

COMPARISON EXAMPLE 1

Instead of the organosilicon resin particles used in Example 1, a commercial porous styrene-divinylbenzene copolymer in particulate form with a particle size of 100 to 120 mesh was used in the gas chromatography column. Other procedures were the same as those described in Example 1. The gas chromatogram obtained is shown in FIG. 2. Peaks for allylamine and aniline did not appear on the gas chromatogram.

Figure 1:
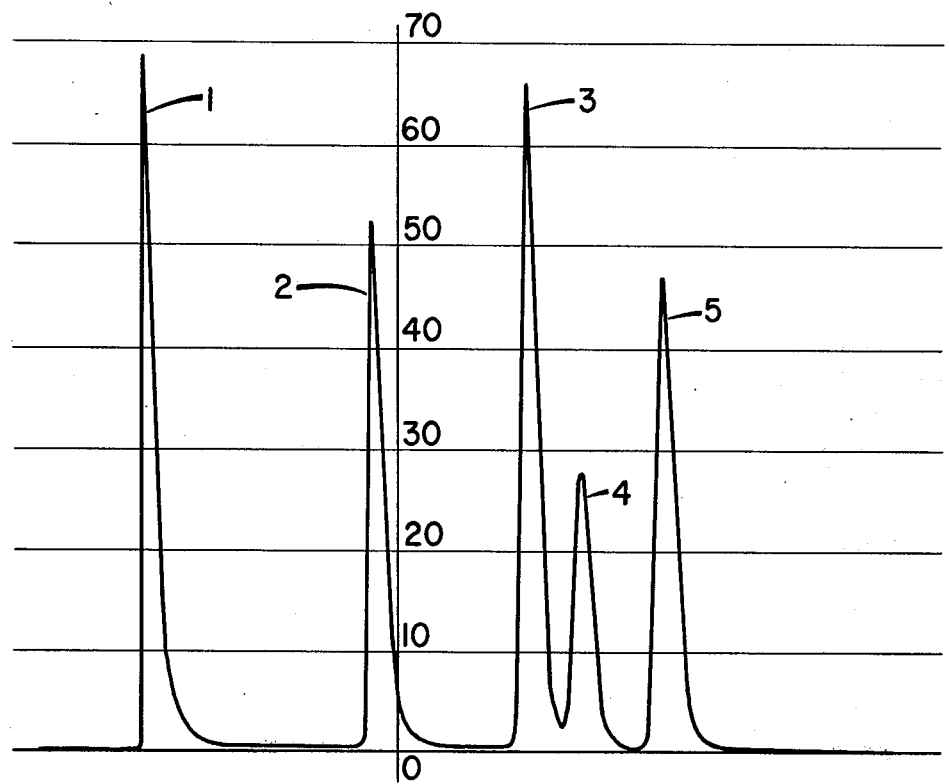
FIG. 1 represents the gas chromatography record obtained in Example 1. The horizontal axis indicates retention time and the vertical axis indicates concentration.
Figure 2:
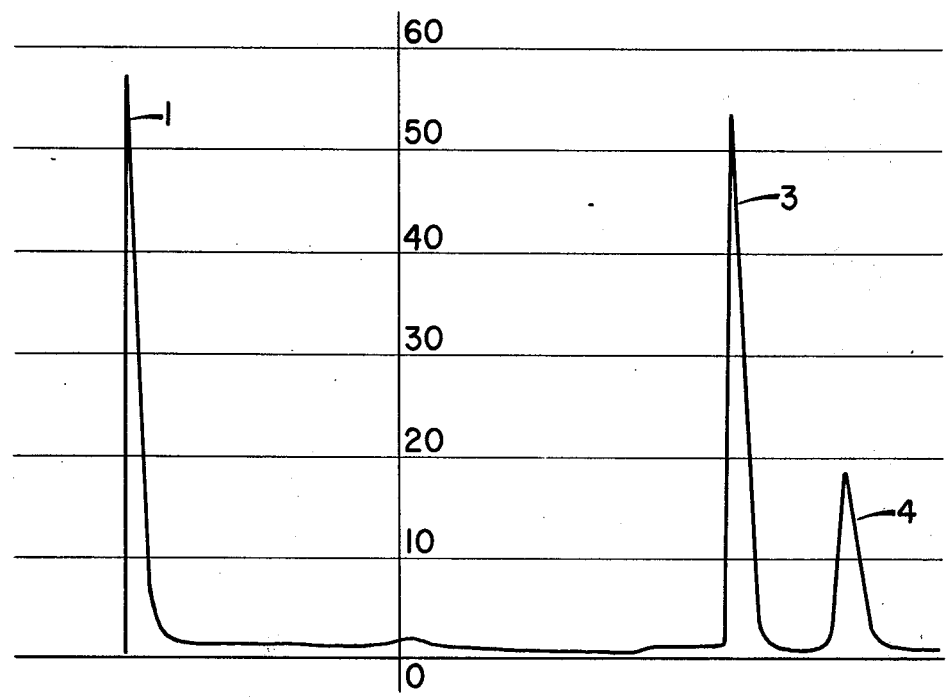
FIG. 2 represents the gas chromatography record obtained in Comparison Example 1. The horizontal axis indicates retention time and the vertical axis indicates concentration.

|   | Boiling Point ° C. |
|---|---|
| 1: Water peak | 100 |
| 2: Allylamine peak | 64–66 |
| 3: Pyridine peak | 115.5 |
| 4: Picoline peak | 128.8 |
| 5: Aniline peak | 184.3 |

That which is claimed is:

1. A gas chromatography column containing a packing material which consists essentially of particulate $RSiO_{3/2}$ resin or particulate resins consisting of $RSiO_{3/2}$ and minor amounts of other siloxane units selected from $R_2SiO$, $R_3SiO_{1/2}$ and $SiO_{4/2}$ or mixtures thereof wherein R is an alkyl group, aryl group, alkenyl group or mixtures thereof, wherein the particle size of the packing material has a mean particle size of from 50–150 mesh as measured by the Tyler Standard Mesh.

* * * * *

UNITED STATES PATENT AND TRADEMARK OFFICE
CERTIFICATE OF CORRECTION

PATENT NO. : 4,145,506
DATED : March 20, 1979
INVENTOR(S) : YOKICHI YAMAMOTO ET AL.

It is certified that error appears in the above-identified patent and that said Letters Patent are hereby corrected as shown below:

Column 2, line 36, "actone" should read --acetone--

Signed and Sealed this

Eleventh Day of September 1979

[SEAL]

Attest:

LUTRELLE F. PARKER
Attesting Officer         Acting Commissioner of Patents and Trademarks